(12) United States Patent
Abraham et al.

(10) Patent No.: US 10,063,636 B2
(45) Date of Patent: *Aug. 28, 2018

(54) ANALYZING REQUESTS FOR DATA MADE BY USERS THAT SUBSCRIBE TO A PROVIDER OF NETWORK CONNECTIVITY

(71) Applicant: comScore, Inc., Reston, VA (US)

(72) Inventors: Magid M. Abraham, Great Falls, VA (US); Gregory Dale, Leesburg, VA (US); Michael A. Brown, Ashburn, VA (US); William Duckworth, Jr., Frederick, MD (US)

(73) Assignee: comScore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,822

(22) Filed: Sep. 14, 2015

(65) Prior Publication Data

US 2016/0006806 A1 Jan. 7, 2016

Related U.S. Application Data (63) Continuation of application No. 12/166,749, filed on Jul. 2, 2008, now Pat. No. 9,137,093.

(Continued)

(51) Int. Cl.
| | | |
|---|---|---|
| *G06F 15/173* | (2006.01) | |
| *H04L 29/08* | (2006.01) | |
| *H04L 29/12* | (2006.01) | |
| *G06Q 30/02* | (2012.01) | |
| *H04L 29/06* | (2006.01) | |

(52) U.S. Cl.
CPC ..... *H04L 67/1095* (2013.01); *G06Q 30/0269* (2013.01); *H04L 29/12009* (2013.01); *H04L 29/12216* (2013.01); *H04L 67/42* (2013.01)

(58) Field of Classification Search
CPC ......... H04L 29/12009; H04L 29/12216; H04L 67/1095; H04L 67/42; G06Q 30/0269
USPC ................ 709/217, 218, 219, 238; 710/316; 340/1.1–16.1; 370/351; 379/219, 242; 398/45–57
See application file for complete search history.

(56) References Cited

U.S. PATENT DOCUMENTS

| | | | | |
|---|---|---|---|---|
| 6,374,295 B2* | 4/2002 | Farrow | ................... | H04L 12/24 709/223 |
| 6,408,950 B1* | 6/2002 | Shoup | ................. | A01B 73/065 111/57 |

(Continued)

OTHER PUBLICATIONS

Office Action issued in U.S. Appl. No. 12/166,749 on Jun. 1, 2010, 13 pages.

(Continued)

*Primary Examiner* — Phuoc Nguyen
*Assistant Examiner* — Davoud Zand
(74) *Attorney, Agent, or Firm* — Baker & Hostetler LLP (57) ABSTRACT

Requests for data received from multiple subscribers are accessed. At least some of the requests for data originate from one or more addresses associated with a particular subscriber of the multiple subscribers. The accessed requests for data are organized into sets of requests based on the one or more addresses such that a set of requests corresponds to the particular subscriber, and a characteristic of the particular subscriber is determined based on aspects of the set of requests corresponding to the particular subscriber and a behavior model.

16 Claims, 6 Drawing Sheets

Related U.S. Application Data (60) Provisional application No. 60/947,584, filed on Jul. 2, 2007.

(56) References Cited

U.S. PATENT DOCUMENTS

| | | | |
|---|---|---|---|
| 6,480,950 | B1 | 11/2002 | Lyubashevskiy et al. |
| 6,651,098 | B1 | 11/2003 | Carroll et al. |
| 6,748,057 | B2 | 6/2004 | Ranalli et al. |
| 6,883,028 | B1 | 4/2005 | Johnson et al. |
| 6,925,442 | B1* | 8/2005 | Shapira ............ G06Q 10/0637 |
| | | | 705/14.66 |
| 6,941,341 | B2 | 9/2005 | Logston et al. |
| 6,963,914 | B1 | 11/2005 | Breitbart et al. |
| 7,117,309 | B2 | 10/2006 | Bearden |
| 7,194,553 | B2 | 3/2007 | Lucco et al. |
| 7,313,614 | B2 | 12/2007 | Considine et al. |
| 7,334,045 | B1 | 2/2008 | Jacobson et al. |
| 7,428,705 | B2 | 9/2008 | Ronald et al. |
| 7,512,702 | B1 | 3/2009 | Srivasta et al. |
| 7,574,523 | B2 | 8/2009 | Traversat et al. |
| 7,673,032 | B1 | 3/2010 | Augart |
| 7,822,410 | B2 | 10/2010 | Coppinger et al. |
| 7,859,992 | B2 | 12/2010 | Buchko et al. |
| 7,958,199 | B2 | 6/2011 | Ferrari et al. |
| 9,137,093 | B1 | 9/2015 | Abraham et al. |
| 2001/0020242 | A1* | 9/2001 | Gupta ................ G06Q 30/02 |
| | | | 715/210 |
| 2002/0038339 | A1* | 3/2002 | Xu ..................... H04L 29/06 |
| | | | 709/203 |
| 2002/0040394 | A1* | 4/2002 | Shapira ............. H04L 12/2602 |
| | | | 709/224 |
| 2002/0062372 | A1* | 5/2002 | Hong .................. H04L 29/06 |
| | | | 709/225 |
| 2002/0083167 | A1* | 6/2002 | Costigan ............. G06Q 30/02 |
| | | | 709/224 |
| 2002/0178180 | A1* | 11/2002 | Kolosova ............. G06Q 30/02 |
| | | | 715/229 |
| 2003/0083938 | A1* | 5/2003 | Smith .................. G06Q 30/02 |
| | | | 705/14.53 |
| 2004/0004968 | A1 | 1/2004 | Nassar |
| 2004/0044791 | A1 | 3/2004 | Pouzzner |
| 2004/0153667 | A1 | 8/2004 | Kastelewicz et al. |
| 2004/0198322 | A1 | 10/2004 | Mercer |
| 2004/0249891 | A1 | 12/2004 | Khartabil et al. |
| 2005/0141506 | A1 | 6/2005 | Aiken et al. |
| 2005/0165914 | A1 | 7/2005 | Moore et al. |
| 2005/0216572 | A1 | 9/2005 | Tso et al. |
| 2006/0167972 | A1 | 7/2006 | Zombek et al. |
| 2006/0212601 | A1 | 9/2006 | Hampton |
| 2007/0022180 | A1 | 1/2007 | Cocotis et al. |
| 2007/0067445 | A1 | 3/2007 | Vugenfirer et al. |
| 2007/0094361 | A1 | 4/2007 | Hoynowski et al. |
| 2007/0150348 | A1 | 6/2007 | Hussain et al. |
| 2007/0153990 | A1 | 7/2007 | Daigle |
| 2007/0156845 | A1 | 7/2007 | Devanneaux et al. |
| 2007/0250468 | A1 | 10/2007 | Pieper |
| 2008/0075067 | A1 | 3/2008 | Guglielmi et al. |
| 2008/0140643 | A1 | 6/2008 | Ismalon |
| 2008/0183672 | A1 | 7/2008 | Canon et al. |
| 2008/0189281 | A1* | 8/2008 | Cancel ................ G06Q 30/02 |
| 2008/0250026 | A1* | 10/2008 | Linden ............. G06F 17/30867 |
| 2008/0275980 | A1* | 11/2008 | Hansen ................ G06Q 30/02 |
| | | | 709/224 |
| 2009/0006635 | A1 | 1/2009 | Siegmund |
| 2009/0006840 | A1 | 1/2009 | Birger et al. |
| 2009/0265374 | A1 | 10/2009 | Bang |

OTHER PUBLICATIONS

Office Action issued in U.S. Appl. No. 12/166,749 on Feb. 3, 2011, 17 pages.

Office Action issued in U.S. Appl. No. 12/166,749 on Feb. 6, 2014, 20 pages.

Office Action issued in U.S. Appl. No. 12/166,749 on Oct. 23, 2014, 21 pages.

Notice of Allowance issued in U.S. Appl. No. 12/166,749 on May 4, 2015, 9 pages.

* cited by examiner

ANALYZING REQUESTS FOR DATA MADE BY USERS THAT SUBSCRIBE TO A PROVIDER OF NETWORK CONNECTIVITY

CROSS-REFERENCE TO RELATED APPLICATIONS

This application is a continuation of U.S. application Ser. No. 12/166,749, filed on Jul. 2, 2008, issued as U.S. Pat. No. 9,137,093, and titled "ANALYZING REQUESTS FOR DATA MADE BY USERS THAT SUBSCRIBE TO A PROVIDER OF NETWORK CONNECTIVITY," which claims priority to U.S. Provisional Application Ser. No. 60/947,584, filed on Jul. 2, 2007, and titled "COLLECTING AND PROVIDING TARGETED INFORMATION TO ADVERTISING COMPANIES," all of which are incorporated by reference.

TECHNICAL FIELD

This disclosure relates to analyzing requests for data made by users that subscribe to a provider of network connectivity to determine a characteristic of a particular subscriber.

BACKGROUND

Subscribers may communicate requests for data stored on a network through a provider of network connectivity.

SUMMARY

In one general aspect, a system includes one or more logs that include data requests received at a network of a provider of network connectivity from multiple subscribers that subscribe to the provider of network connectivity. The data requests include a first request received from a particular subscriber during a first time period in which a device associated with the particular subscriber is assigned a first address by the provider of network connectivity, and a second request received from the particular subscriber during a second time period in which the device associated with the particular subscriber is assigned a second address by the provider of network connectivity. The first address and the second address are different and the first time period and second time period are different. The system also includes an analyzer configured to access the one or more logs, access a mapping that maps the first address to a unique subscriber identifier associated with the particular subscriber and that maps the second address to the unique subscriber identifier associated with the particular subscriber, and organize the data requests included in the one or more logs into sets of requests based on the accessed mapping such that a set of data requests corresponds to the particular subscriber and includes the first request and the second request. The system also includes a profiler including a behavior model, and a behavior analyzer configured to determine a characteristic of the particular subscriber based on aspects of the set of requests corresponding to the particular subscriber and the behavior model.

Implementations may include one or more of the following features. The data requests may include Uniform Resource Locators (URLs) of a destination resource, and the system may include a dictionary that associates at least a portion of the URLs with a numerical value. The system also may include a data scrubber configured to access the sets of requests, determine corresponding numeric numerical values for the URLs included in the sets of requests based on the dictionary, and replace the data requests included in the sets of requests with the associated numerical values. The analyzer may analyze the set of requests corresponding to the particular subscriber to determine search terms included in the data requests included in the set, analyze the set of requests corresponding to the particular subscriber to determine destinations requested as a result of the search terms, and transfer the search terms and the destinations to the profiler. To determine a characteristic of the particular subscriber based on aspects of the set of requests corresponding to the particular subscriber, the behavior analyzer may determine a characteristic of the particular subscriber based on the search terms and the destinations. The analyzer may remove personally identifying information from the search terms. To determine a characteristic of the particular subscriber, the behavior analyzer may determine a propensity of the particular subscriber switching from the provider of network connectivity to a different provider of network connectivity. To determine a characteristic of the particular subscriber, the behavior analyzer may determine a propensity of the particular subscriber to receive a particular good or service.

Implementations may include a switch to receive the data requests from the multiple subscribers on a first port, the switch being configured to mirror the data requests to a second port, and a device coupled to the second port and configured to receive the data requests mirrored to the second port and store the mirrored data requests in the one or more logs. An opt-out list including unique subscriber identifiers may be included, and the analyzer may be configured to access data requests received from subscribers other than subscribers associated with the unique subscriber identifiers included in the opt-out list.

In another general aspect, a system includes a request analysis server that includes an analyzer configured to access requests for data received from multiple subscribers, where at least some of the requests for data originating from one or more addresses associated with a particular subscriber of the multiple subscribers. The accessed requests for data are organized into sets of requests based on the one or more addresses such that a set of requests corresponds to the particular subscriber. The system also includes a profile server includes a behavior model, and a behavior analyzer configured to determine a characteristic of the particular subscriber based on aspects of the set of requests corresponding to the particular subscriber and the behavior model.

Implementations may include one or more of the following features. The characteristic of the particular subscriber may include a propensity of the subscriber switching from a first provider of network connectivity to a second provider of network connectivity. The request analysis server may be located on a network of the first provider of network connectivity, and the requests for data received from multiple subscribers may be requests for data received at the network of the first provider of network connectivity. A characteristic of the particular subscriber may be a propensity of the subscriber to receive a particular good or service. The requests for data may include identifiers of the data, and the system further comprising a dictionary that associates numerical values with at least a portion of the identifiers of the data.

Implementations may also include a data scrubber configured to access the sets of requests, access the dictionary, and replace the identifiers of the data with the associated numerical values. The system may include a data source including an identifier associated with the particular subscriber, the identifier may identify the particular subscriber to an advertiser. The identifier associated with the particular subscriber may include a cookie identifier that identifies the particular subscriber to the advertiser. The one or more addresses associated with a particular subscriber may include a first address assigned to a device of the particular subscriber for a first time period and a second address assigned to the device of the particular for a second time period, the first address may be different from the second address, and the log analyzer may be configured to organize the requests for data based on the first and second addresses such that the set of requests that corresponds to the particular subscriber includes requests made when the first address was assigned to the device of the particular subscriber and requests made when the second address was assigned to the device of the particular subscriber.

Implementations also may include an opt-out list including identifiers of subscribers, and the analyzer may be configured to access requests for data received from subscribers other than subscribers associated with the identifiers.

In another general aspect, requests for data received from multiple subscribers are accessed. At least some of the requests for data originate from one or more addresses associated with a particular subscriber of the multiple subscribers. The accessed requests for data are organized into sets of requests based on the one or more addresses such that a set of requests corresponds to the particular subscriber, and a characteristic of the particular subscriber is determined based on aspects of the set of requests corresponding to the particular subscriber and a behavior model.

Implementations may include one or more of the following features. Accessing requests for data received from multiple subscribers may include receiving mirrored requests for data received from multiple subscribers and accessing the mirrored requests for data. An identifier of the particular subscriber may be extracted from the set of requests corresponding to the particular subscriber, the identifier identifying the particular subscriber to an advertiser, and the extracted identifier and the determined characteristic may be transferred to the advertiser. The identifier of the particular subscriber may be a cookie provided by the advertiser. The one or more addresses associated with a particular subscriber may include a first address assigned to a device of the particular subscriber for a first time period and a second address assigned to the device of the particular for a second time period. The first address may be different from the second address, and the log analyzer may be configured to organize the requests for data based on the first and second addresses such that the set of requests that corresponds to the particular subscriber includes requests made when the first address was assigned to the device of the particular subscriber and requests made when the second address was assigned to the device of the particular subscriber.

Implementations also may include accessing an opt-out list including identifiers of subscribers. Accessing requests for data received from multiple subscribers may include accessing requests for data received from subscribers other than subscribers associated with the identifiers. Requests for data received from a panel of network users may be accessed, where the panel of network users includes individual users having known characteristics. A behavior model may be built based on the requests for data received from a panel of network users and the known characteristics of the individual users included in the panel of network users.

Implementations may include comparing the sets of requests for data to a dictionary including at least portions of requests for data and numerical values representing the portions of requests for data stored in association with the portions of requests for data, and determining corresponding numerical values for the requests for data included in the sets of requests based on the comparison. Requests for data included in the sets of requests for data may be replaced with the corresponding numerical values.

Implementations of the described techniques may include hardware, a method or process, or computer software on a computer-accessible medium. The details of one or more implementations are set forth in the accompanying drawings and the description below. Other features will be apparent from the description and drawings, and from the claims.

DETAILED DESCRIPTION

Figure 1:
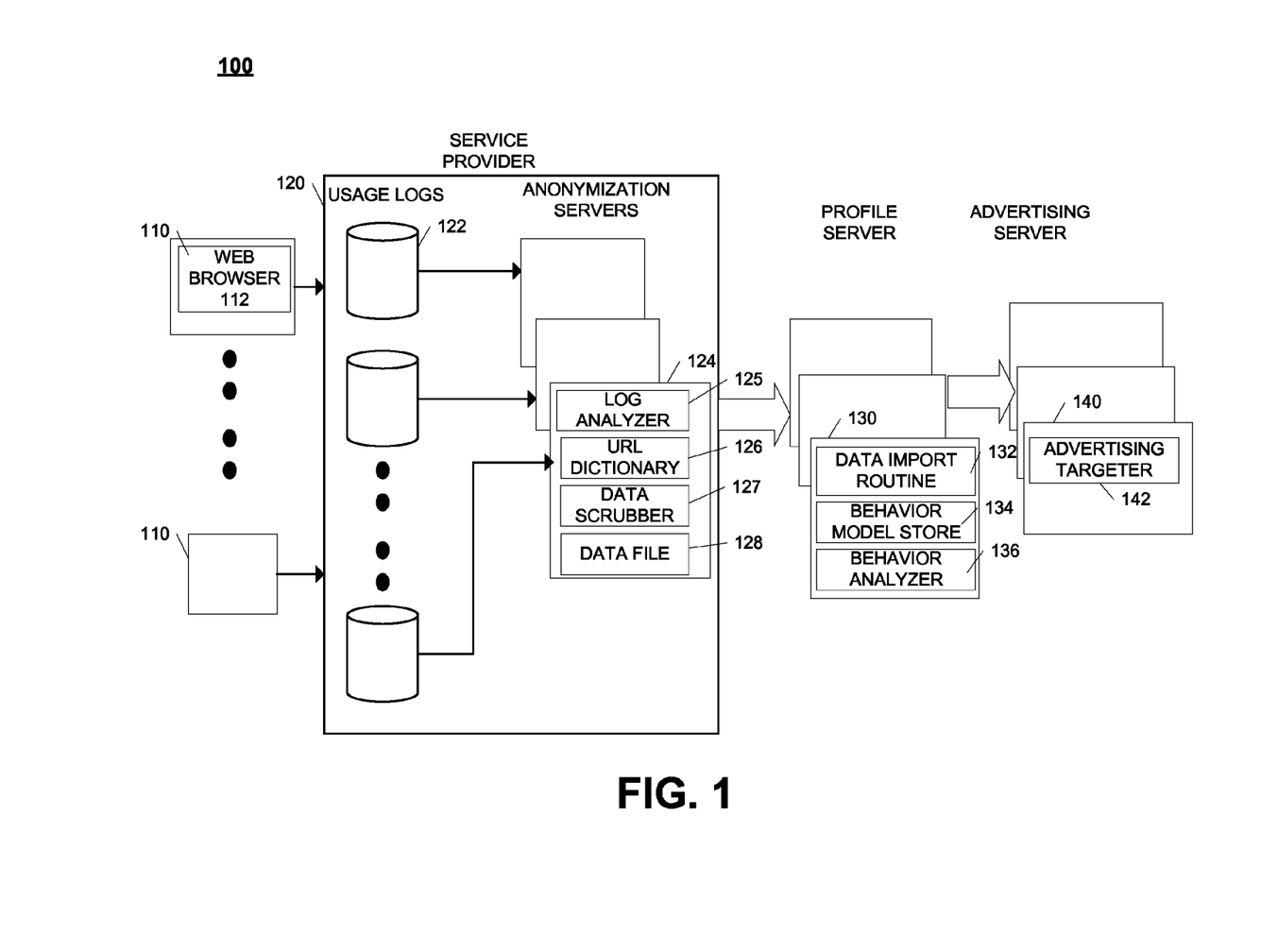
FIG. 1 illustrates an example of a system for characterizing the behavior of subscribers.

Referring to FIG. 1, a system 100 characterizes the behavior of users that subscribe to a provider of network connectivity (such users may be referred to as subscribers) based on the Internet or other network browsing activities of the subscribers. The provider of network connectivity also may be referred to as a service provider. The system 100 may provide the behavior characterization to third parties such that the third parties may target the subscribers with advertisements relevant to the subscriber's interests. For example, the system 100 may determine that a subscriber is interested in purchasing an automobile (e.g., the subscriber is a car intender) based on the subscriber making multiple requests for data related to automobiles. In particular, the requests for data made by the subscriber may be compared to a data model of the types of requests for data made by a sample of on-line users known to be interested in purchasing a new car. Based on the comparison to the data model, the subscriber's on-line browsing activity (such as the subscriber's requests for web pages or other data) may be characterized as being similar to that of a user interested in purchasing a new car. The characterization of the subscriber's requests for data may be provided to an advertiser, and the advertiser may use the characterization to target the subscriber with relevant advertising. For example, the subscriber may be targeted with advertisements related to new cars.

In another example, the system 100 may determine that a subscriber is intending to, or is likely to, switch to another provider of network connectivity. A provider of network connectivity may be a provider of communications and data services, such as an Internet service provider, a cable television provider, a provider of satellite connectivity services, and/or a provider of dial-up connection services. A subscriber considering switching to another provider of network connectivity may be referred to as a "potential switcher" or a "churn intender." For example, a subscriber interested in switching to another provider of network connectivity may search on web sites of competitor providers of network connectivity for details of the competitor's connectivity or data services, such as prices for connection services, speed of connections, and/or television listings offered by the competitor. As discussed in more detail below, for example with respect to FIG. 3, analysis of past requests for data made by one or more subscribers known to have switched to another provider of network connectivity may be used to determine a model of network activity indicative of a subscriber that is likely to switch to another provider of network connectivity. Thus, data provided by the system 100 may be used to identify subscribers likely to switch to another provider of network connectivity such that the subscriber's current service provider may approach the subscriber with, for example, inducements or incentives to remain with the current service provider. Accordingly, in this example, instead of providing the characterization of the subscriber's requests to a third-party such that the subscriber may receive particular advertisements, the characterization is provided to the subscriber's current provider of network connectivity. Additionally, the churn intender may be identified to the provider of network connectivity by, for example, providing a unique identifier that is assigned by the service provider to the churn intender.

In particular, the system 100 includes subscribers 110 and a service provider 120 that maintains usage logs 122. The system 100 also includes anonymization servers 124, a profile server 130, and an advertising server 140. The service provider 120 may be an entity that provides subscribers 110 with access to the Internet or an entity that provides subscribers 110 with access to both the Internet and television service (such as cable television service). Subscribers 110 may, for example, access web sites or perform web searches using a browser 112.

The advertising server 140 provides advertisements for viewing by website visitors (such as the subscribers 110). For example, a subscriber 110 may visit a website that includes advertisements for several products and services. These advertisements may be provided by an advertising server 140. The advertising server 140 may store advertisements from multiple entities that advertise goods and services over the Internet. Additionally, the advertising server 140 may store multiple advertisements for a particular provider of goods and services. Thus, the advertisements that the subscriber 110 views on a particular website may change from visit to visit.

The advertisements may be included in a web page using a uniform resource locator (URL) that points to the advertising server 140. When the subscriber's web browser 112 renders the web page and encounters the URL, the web browser 112 makes a request using the URL. Because the URL points to the advertising server 140, the browser 112 makes the request to the advertising server 140 for the image or other object that constitutes the advertisement. If the subscriber's browser 112 has not previously requested an advertisement from the advertising server 140, then the response may include the advertisement (e.g., an image or other object) and a cookie that includes an identifier unique to the subscriber 110. The subscriber's browser 112 stores the cookie and appends the cookie to future requests to the advertising server 140. Thus, future requests to the advertising server 140 may include the cookie and, therefore, include the unique identifier for the subscriber 110. The advertising server 140 may use this identifier to help decide what particular advertisement to send the subscriber 110, and to track certain information, such as what advertisements the subscriber has selected. As discussed in more detail below, the identifier in the cookie may be used to identify the subscriber 110 to the advertising server 140 when providing the advertising server 140 with categories for the subscriber 110 that are determined based on the subscriber's browsing habits.

The subscribers 110 begin an on-line session with the service provider 120 and make requests for data using a web browser 112. The subscribers may, for example, make requests for web pages, or web searches, using the web browser 112. The requests for data are received by the service provider 120 and the service provider 120 forwards the requests for data to a destination specified by the requests for data. The service provider 120 also records and stores the requests for data (e.g., Hypertext Transfer Protocol (HTTP) requests) made by each subscriber 110 in the usage logs 122. Some of the requests may include cookies, such as the advertiser cookies discussed above (e.g., when the request is a request for an advertisement from an advertising server). The usage log 122 also may include data related to responses sent to the subscriber 110. The service provider 120 may maintain many usage logs 122 and the usage logs 122 may be segmented geographically. For example, a particular usage log 122, or group of usage logs 122, may store data associated with subscribers in the metropolitan area of Washington, D.C. while another usage log 122, or group of usage logs 122, may store data associated with subscribers in the New York City area.

The service provider 120 processes the requests for data with the anonymization servers 124. In particular, the anonymization servers 124 may process the data in the usage logs 122 to remove personal identifying information (PII) before the service provider 120 provides any data associated with the subscribers 120 to a third party such as the advertising server 140. Thus, the anonymization servers 124 may protect the privacy of the subscribers 110. The anonymization servers 124 also may be referred to as a request analysis server.

The anonymization servers 124 may include a log analyzer 125, a uniform resource locator (URL) dictionary 126, a data scrubber 127, and one or more data files 128. The log analyzer 125 may analyze the data from the usage logs 122. For example, the log analyzer 125 may sort, organize, and/or group the data from the usage logs 122 by an internet protocol (IP) address associated with a particular subscriber such that requests for data made by a particular subscriber are grouped together by IP address. In some implementations, and as discussed below, the log analyzer 125 may do so even if the IP address assigned to the particular subscriber has changed by using a mapping that maps the subscriber's IP address to a unique subscriber identifier assigned by the service provider 120. The unique service provider identifier may be a hashed value of the subscriber's account number with the service provider 120 associated with a router through which multiple subscriber machines transmit requests for data. If the IP address is one that is associated with a router, the requests for data may be analyzed to help estimate the number of machines connected to the router. In another example, the address associated with the requests for data may be an identifier of a particular device on a communications network or a Media Access Control (MAC) address.

The PII of the subscribers 110 may be removed from the requests for data using a data scrubber 127. The PII may include data such as usernames and passwords of the subscribers 110, the content of queries made to Internet search engines by the subscribers 110, and personal information of the subscribers 110 such as birth date, residence address, and/or social security number. In particular, the data scrubber 127 may use the URL dictionary 126 to translate a subscriber's requests for data from a text string that includes a requested URL and other information (some of which may include PII, such as a query to a search engine) to a numerical value that represents a particular URL or a portion of a URL. For example, a user may enter a query at google.com. This may result in a request to www.google.com/webhp?q=username. A pattern may map www.google.com/webhp to a particular integer. Because the part of the URL following the "?" may include PII, this information is scrubbed by mapping the base URL (absent the URL parameters) to an integer.

The anonymization servers 124 also includes the data file 128. The data file 128 may include an identifier of the subscribers 110 that is associated with the scrubbed requests for data created by the data scrubber 127. For example, the identifier of the subscriber 110 may be a cookie provided by an on-line entity (e.g., an advertiser) from which the subscriber requested data. The data file 128 may include multiple identifiers for a particular subscriber 110. For instance, the anonymization server 124 may group the requests from a particular subscriber together based on the IP address of the subscriber. The anonymization server 124 may review the requests to identify those requests made to particular advertising servers. The anonymization server 124 may extract the cookies from those requests and determine the advertising cookie identifier for that subscriber. This cookie identifier for the particular advertiser may be used to represent the subscriber 110 (and used as an identifier of the subscriber 110 to a particular advertiser).

Additionally, even if the cookie identifier is not included in the group of requests being analyzed (e.g., the subscriber 110 blocks, deletes, or otherwise makes the cookie unavailable), the identifier may be known and used for the subscriber 110 if the cookie identifier was sent in an earlier group of requests and the subscriber's IP address remains the same between the earlier group of requests and the group of requests being analyzed. The service provider 120 assigns an Internet protocol (IP) address to the subscriber 110 for a particular length of time. If at least one request from the subscriber 110 includes the cookie, the identifier included in the cookie may be associated with the subscriber's IP address and known during the period the same IP address is assigned to the subscriber 110, even if the cookie is not present in a given set of requests being analyzed. For example, if a set of requests sent on a Monday are analyzed and include the cookie, the identifier can be used for a set of requests sent on Tuesday and analyzed, even if the Tuesday requests do not include the cookie. Alternatively or additionally, the service provider 120 may provide a unique subscriber identifier for the subscriber 110 that maps to the subscriber's IP address so that the cookie identifier may be considered valid even if the subscriber 110 has blocked the cookie and a new IP address is assigned to the subscriber 110. For example, if a cookie is observed while the subscriber 110 has a first IP address, but is not observed when the subscriber is assigned a new IP address, the cookie identifier may still be used if the service provider 120 provides the anonymization server 124 with a mapping between the subscriber's current IP address and a unique subscriber identifier for the subscriber.

The profile server 130 is configured to build a profile of the subscriber 110 based on the subscriber's requests for data and to characterize the behavior of the subscriber by comparing the profile to a behavior model of an on-line user having known characteristics. The profile server 130 includes a data import routine 132, a behavior model store 134, and a behavior analyzer 136. The profile server 130 also may be referred to as a profiler.

The data import routine 132 imports data that includes an identifier of a subscriber 110 and data associated with requests for data made by the subscriber 110. For example, the data import routine 132 may import the data file 128 from the service provider 120. For a given subscriber 110, the data file 128 may include at least one advertiser cookie identifier for the subscriber 110 (obtained by receiving the subscriber's requests to the advertisers) and a list of one or more integers representing the URLs (or portions of URLs) requested by the subscriber 110.

The profile server 130 also includes a behavior model store 134 that stores one or more behavior models. The behavior models in the behavior model store 134 provide models of the on-line activity of users with known characteristics. As discussed in more detail with respect to FIG. 3, the behavior models may be derived from the on-line activities of a panel of users having known characteristics. For example, several members of the panel may be known to be interested in purchasing a new car. The on-line activities of these panel members (such as requests for data made by the panel members) may be analyzed and used to model the types of on-line activities in which a user interested in purchasing a new car would engage. The behavior model store 134 may include models of many different types of behaviors. The behavior analyzer 136 compares the data associated with the subscriber 110 and imported into the profile server through the data import routine 132 to the models in the behavior model store 134 such that categories can be assigned to the subscriber 110. For example, the behavior model may be applied to the integers representing the URLs requested by the subscriber 110 to determine one or more categories for a subscriber 110 (e.g., "car intender" or "parent").

The categories assigned to the subscriber 110 and the advertising cookie identifier assigned to the subscriber 110 by the advertising server 140 is provided to the advertising server 140. The advertising server 140 includes an advertising targeter 142. The advertising targeter 142 identifies targeted advertisements that are related to the interests of the subscriber 110 according to the categories assigned to the subscriber 110. For example, if the subscriber is identified as likely to be interested in purchasing a new car, the advertising targeter 142 selects an advertisement for a new car, and the advertising server 140 provides the selected advertisement to the subscriber 110. For instance, when the subscriber 110 requests an advertisement from the advertising server 140, the cookie identifier is included in the request. The advertising targeter 142 uses the cookie identifier to look up the categories for the subscriber 110, select advertisements, at least in part, based on one or more of the categories, and send the selected advertisement to the subscriber 110. The advertisements may be Internet-based advertisements (for example, advertisements that the subscriber views with a web browser). In some implementations, the advertisements may be targeted television advertisements. For example, the service provider 120 may be a provider of cable television service and Internet services. In this example, the subscriber's web browsing habits may be analyzed and used to provide the subscriber 110 with targeted television advertisements.

In some implementations, the system 100 may be used to identify subscribers belonging to a particular category. For example, as described above, some implementations of system 100 may be used to identify subscribers that are churn intenders. In such an implementation, the system 100 may not associate a cookie or other third party identifier with the information regarding the user's requests and subsequent responses. In this case, the profile server 130 may identify to the service provider 120 the IP, or other, address, or the unique subscriber identifier associated with those subscribers that have been categorized as churn intenders.

Figure 2:
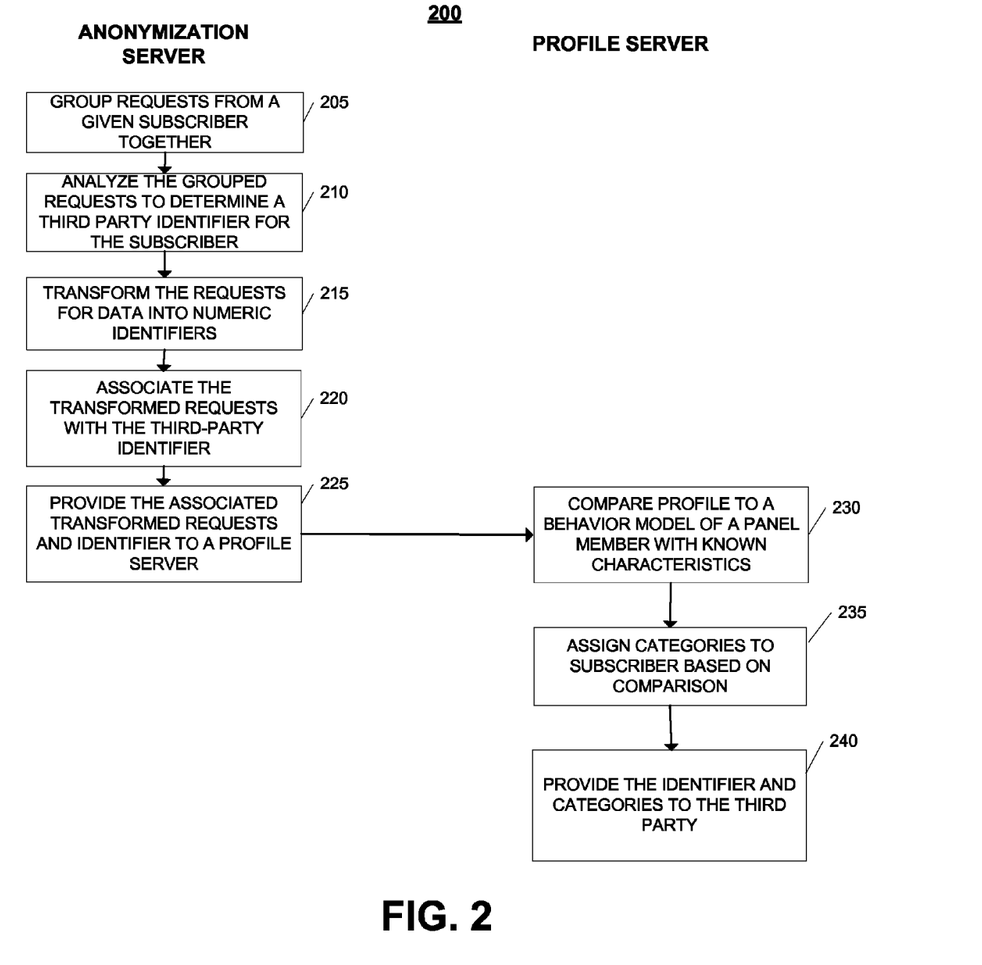
FIG. 2 illustrates an example of a process that assigns categories to an on-line user that is a subscriber to a provider of network connectivity.

Referring to FIG. 2, an example process 200 assigns categories to an on-line user that is a subscriber of a service provider. The process 200 may be performed on a system such as the system 100 described with respect to FIG. 1. The process 200 may be performed by one or more processors included in the anonymization server 124 and/or one or more processors included in the profile server 130, for example. The on-line user may be a subscriber such as the subscriber 110 described above with respect to FIG. 1. The remainder of this discussion will refer to the on-line user as a "subscriber." An anonymization server groups requests from a given subscriber together (205). The anonymization server may be the anonymization server 124. The anonymization server 124 may organize requests from a given subscriber by grouping together the requests that originate from the same IP address or that have IP addresses that map to the same unique subscriber identifier. Generally, the IP address is assigned to the client machine of the subscriber 110 by the service provider 120 through which the subscriber connects to the Internet. Responses received from websites also may be recorded with the requests for data and the IP address. The IP address and the requests for data may be stored in usage logs maintained by the service provider 120. For example, the usage logs may be similar to the usage logs 122 described with respect to FIG. 1.

The grouped requests are analyzed to determine a third-party identifier of the subscriber (210). For example, the requests may be analyzed to detect a request to a particular advertising server, and then a cookie in that request may be analyzed to determine an identifier assigned to the subscriber by the particular advertising server. The advertising server may be an advertising server such as the advertising server 140 discussed above with respect to FIG. 1.

Requests for data are transformed into numerical identifiers (215). Transforming the requests for data may further protect the privacy of the subscriber 110 who made the requests for data. The requests for data may be transformed using the data scrubber 127 described with respect to FIG. 1. In particular, the data scrubber 127 may transform the requests for data into a numerical value that represents the URL (or portion of the URL) to which the request for data was directed. Separately, or as part of the process of transforming the requests, the data scrubber 127 may remove any PII from the requests for data to protect the subscriber's privacy.

For example, the request for data may be a query to a search engine asking for the weather in Washington, D.C. The query in this example is: http://www.google.com/search?hl=en&q=weather+in +washington+de&btnG=Search. The data scrubber 127 removes the PII from this request for data by transforming the base URL of http://www.google.com/search? into an integer. By mapping only the base URL to an integer, the data scrubber 127 has removed PII from the request for data. The location information in this example may be considered PII because it may be the subscriber's residence, or a location where the subscriber would like to travel. A dictionary, such as the URL dictionary 126, may include a translation table or algorithm that transforms requests for data into numerical values. Translation of the transformed request for data may further protect the subscriber's privacy because the content of the transformed request for data is unknown without the conversion information.

Continuing this example, the transformed request for data http://www.google.com/search? may be represented as numerical identifier (or pattern) #1234567 based upon a conversion specified by the dictionary. In some implementations, the value of the numerical identifier may indicate a category to which the request for data belongs. For example, in addition to "#1234567" indicating that the user requested the Google website, one or more of the digits in #1234567 may indicate that the request for data was made to a search engine. In other examples, one or more of the digits in the numerical identifier may indicate the type of merchandise or the types of services offered by a website from which the subscriber 110 requested data.

The transformed requests for data are associated with the third-party identifier of the subscriber (220). The identifier identifies the subscriber to a third-party website, and the service provider 120 accesses and stores the identifier with the transformed requests for data made by the subscriber 110. Because the requests for data are stored along with the subscriber's IP address (which remains the same at least for the time period over which the requests are analyzed), the third-party identifier also may be associated with all of the requests for data made by the subscriber 110.

The transformed requests and the associated identifier of the subscriber 110 are provided to a profile server (225). The identifier of the subscriber 110 may be one or more third-party identifiers that were associated with the subscriber in (e.g., if identifiers are determined for multiple advertising servers, the multiple identifiers may be provided) (220). The profile server may be similar to the profile server 130 discussed above with respect to FIG. 1. In particular, the profile server 130 builds a profile of the subscriber 110 based upon the information the anonymization server 124 provides to the profile server 130. As explained in more detail below, the profile server 130 compares the Internet browsing activities of the subscriber 110 to a behavior model included in the behavior model store 134 to assign one or more categories to the subscriber.

The profile of the subscriber 110 is compared to behavior model of a user with known characteristics (230). The profile includes the transformed requests for data associated with the one or more identifiers of the subscriber 110. In the example above, the transformed request for data made by the subscriber 110 is #1234567, and this numerical identifier is associated with the third-party identifier. The profile of the subscriber 110 may include numerical identifiers representing the requests for data made by the subscriber 110 over a particular amount of time (e.g., requests made over hours, days, or weeks). The profile may be updated regularly with additional requests for data made by the subscriber 110.

The behavior model of the may be created based on requests for data made by one or more panel members who are known to be interested in certain items. As discussed in greater detail with respect to FIG. 3, the panel includes a relatively limited group of on-line users who are a representative sample of Internet users or a representative sample of a type of Internet users of interest to entities such as advertisers and retailers. The characteristics of the panel members are known. For example, it may be known that particular members of the panel are, for example, interested in purchasing a new car, in the process of planning a vacation, tend to engage in on-line financial planning and management, and/or have switched, or are considering switching, from one provider of network connectivity to another provider of network connectivity. Thus, analysis of the on-line browsing activities of the panel members together with the known characteristics of the panel members allows a behavior model to be created.

The subscriber 110 (identified by one or more third-party identifiers) may be assigned categories based on comparing the subscriber's profile to the behavior model (235). For example, if the transformed requests for data included in the subscriber's profile match, or approximately match, those in a behavior model of an on-line user interested in buying a new car, the subscriber 110 may be categorized as also being interested in buying a new car (e.g., the car intender category may be assigned to the subscriber).

As discussed in greater detail below with respect to FIG. 3, the behavior models may be location-based models that characterize a subscriber's browsing activity based on a minimum level of activity at particular websites, or particular types of websites. Subscribers categorized based on location-based models may be referred to as "opt-in" targets. Additionally or alternatively, the behavior models may be logistical models that consider the subscriber's visits to many different categories of websites. Subscribers categorized based on logistical models may be referred to as "qualified" targets.

In some implementations, a propensity score may be used to indicate how well the subscriber's browsing activity matches the location-based or logistical behavior model. For example, the subscriber's browsing activity may be analyzed with respect to a location-based model that indicates that ten visits to a car-related website over a period of five days is indicative of a subscriber being a car intender. If a subscriber 110 visits a car-related website nine times in five days, the subscriber may have a propensity score of, for example, 0.9. In general, a propensity score close to one indicates that the subscriber 110 matches the behavior model very closely; thus, there is a high likelihood that the subscriber 110 belongs in the category. In contrast, a propensity score close to zero indicates that the subscriber 110 has a low likelihood of belonging to that category.

The profile server 130 provides the identifier(s) of the subscriber 110 and the assigned categories to one or more third parties (240). For example, the profile server 130 may provide the categories to a particular advertising server 140 with the identifier assigned by that advertising server 140. The advertising server 140 then may use the identifier to look up the categories and better target advertisements to the subscriber 110.

In some implementations, the process 200 may be used to identify subscribers belonging to a particular category. For example, as described above, some implementations of process 200 may be used to identify subscribers that are churn intenders. In such an implementation, the profile server 130 may simply identify to the service provider 120 the IP, or other, address, or the unique subscriber identifier associated with those subscribers that have been categorized as churn intenders.

Figure 3:
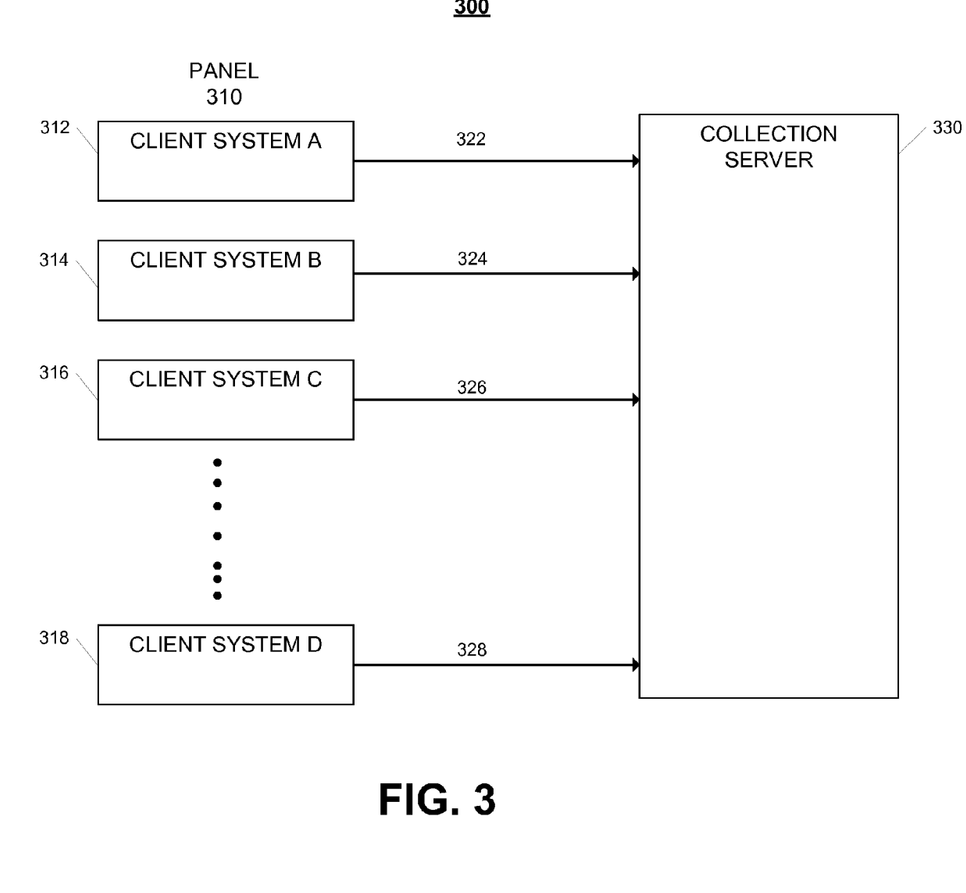
FIG. 3 illustrates an example of a system in which a panel of computer users transmit data to a collection server.

Referring to FIG. 3, a panel of computer users 310 transmit data to a collection server 330. The transmitted data relates to the Internet browsing activity of the panel of computer users 310. The data that is aggregated at the collection server 330 is used to build behavior models representing the on-line browsing activities of users with known characteristics. Data may be aggregated over a period of time such as days, weeks, or months. The panel of users 310 may be a group of users that are representative of a larger group of users. For example, the panel of users 310 may be composed such that the panel reflects an average Internet user. In another example, the panel of users 310 may be composed of users belonging to one or more demographic groups of interest to providers of goods and services.

The panel 310 may include a relatively small number of users while still providing a representative sample of users. Additionally, the characteristics of the members of the panel 310 is known. For example, particular members of the panel 310 may be known to be interested in buying a new car. In another example, more complex behavior and lifestyle characteristics of members of the panel 310 may be known. Particular members of the panel 310 may be high-volume cellular telephone users, hold particular positions within organizations (such as positions that entail making business decisions), and/or watch television with low frequency compared to the general population.

In another example, particular members of the panel 310 may be known to have switched from one provider of network connectivity to another provider of network connectivity. Thus, because the behavior characteristics and historical requests for data are both known for the members of the panel 310, profiles of requests for data made by persons having particular characteristics may be developed. For example, requests for data made for ninety days before a panel member switched to another provider of network connectivity may be analyzed to determine the types of requests for data made by the panel member in the period before switching to another provider. Such analysis may reveal, for example, that the panel member made thirty requests to the web sites of five different providers of network connectivity over the ninety day period.

In the example shown in FIG. 3, the panel of users 310 includes client systems 312, 314, 316, and 318. However, in other implementations, the panel 310 may be composed of more or fewer client systems. Installed on each of the client systems 312, 314, 316, and 318 is a browser, or similar program, configured to send requests for data to websites and receive information from the websites in response to the requests for data. Each of the client systems 312, 314, 316, and 318 sends data 322, 324, 326 and 328, respectively, to the collection server 330 where the data 322, 324, 326 and 328 is stored and processed. The data 322, 324, 326 and 328 may be, for example, more information about requests for data made by the panel members and the resulting responses. The data 322, 324, 326 and 328 may be used to build behavior models representing the browsing activity of the members of the panel 310.

The collection server 330 may store the data 322, 324, 326 and 328. In the example shown in FIG. 3, there is one collection server 330. However, in other implementations there may be more than one collection server 330. For example, each of the client systems 312, 314, 316, and 318 may send data 322, 324, 326 and 328 to more than one collection server for redundancy. In other implementations, the client systems 312, 314, 316, and 318 may send data 322, 324, 326 and 328 to different collection servers. In this implementation, the data 322, 324, 326, and 328, which represents data from the entire panel, may be communicated to and aggregated at a central location for later processing. In this implementation, the central location may be one of the collection servers.

The data 322, 324, 326 and 328 is used to build behavior models of the browsing activities of the members of the panel of users 310. The behavior models may be location-based models that characterize a user's browsing activity based on a minimum level of activity at particular websites. Additionally or alternatively, the behavior models may be logistical models based on known information regarding the members of the panel 310 and the actual web browsing activities of the members of the panel 310.

Location-based models characterize behavior of an on-line user based on the frequency of the user's visits to a particular website or type of website. For example, a user that visits a particular automobile-related website fifteen times within one week may be characterized as an "Auto Shopper" (e.g., a category of users who are interested in purchasing automobiles). Additionally, a user that visits multiple, different automobile-related websites more than a threshold number of times within a period of time also may be characterized as an "Auto Shopper." The threshold number of visits for characterizing a user as a member of a particular group may be determined from the data 322, 324, 326 and 328. For example if the panel member, or members, associated with the client machine 312 are known to be interested in buying a new car, the data 322 may be analyzed to determine how many requests for data to automobile-related websites are made from the client machine 312. Users identified based on a location-based model may be referred to as "opt-in" targets.

Logistical models, or other statistical models, may be constructed from data that includes multiple survey-based attributes associated with on-line users along with recorded Internet browsing activities of the users. The logistical models may be used to characterize on-line users as likely members of a group of on-line users that is not easily identified by visits to a particular website or a particular type of website. For example, the logistical models may be used to model the on-line behavior of users that are high-volume cellular telephone users or watch television less than the general population.

Data for the logistical models also may be derived from the panel of users 310. Personal attributes of the members of the panel of users 310 may be collected by, for example, surveying the members of the panel of users 310. Internet browsing activities of the members of the panel of users 310 may be collected at the collection server 330 as described above. Many personal attributes may be collected. In some implementations, over two thousand attributes may be associated with the members or households included in the panel of users 310. The logistical models may include, for example, over one hundred twenty categories and website destinations associated with the categories. Users that are characterized based on the logistical models may be referred to as "qualified" targets.

Thus, behavior models, such as the location-based and logistical models described above, may be created based on the data 322, 324, 326 and 328 from the panel of users 310 and known characteristics of the members of the panel of users 310. The browsing activities of on-line users other than those included in the panel of users 310 (such as the subscribers 110 described with respect to FIG. 1) may be characterized using the behavior models. These behavior models may be used as described above with respect to FIGS. 1 and 2.

Figure 4A:
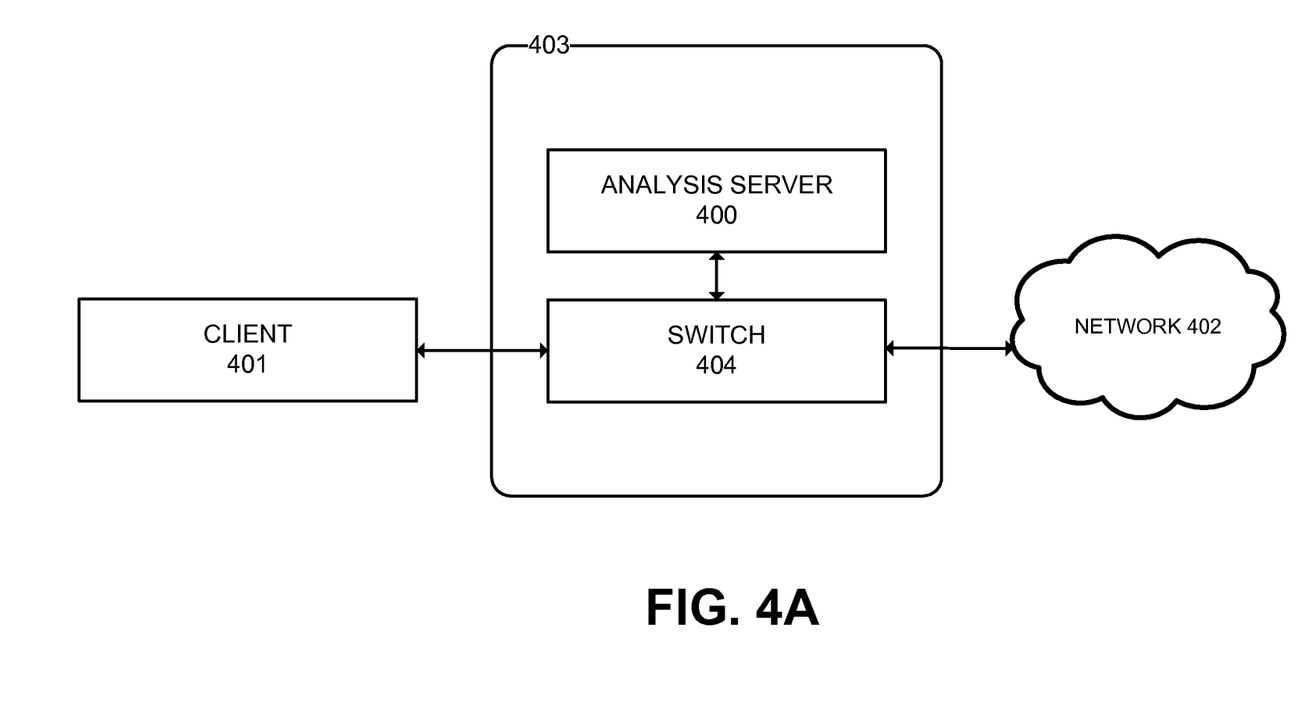
FIGS. 4A and 4B illustrate an example of a system for characterizing the behavior of subscribers.

Referring to FIG. 4A, port mirroring may be used to deliver copies of request(s) for data to a request analysis server 400. A client machine 401 maybe used by a subscriber to issue requests for data and to retrieve information from a network 402. The network 402 may be, for example, the Internet. The requests for data made from the client machine 401 are received at a switch 404 located at a provider of network connectivity 403. The switch 404 mirrors the requests for data (or other network traffic received at the provider of network connectivity 403) to the request analysis server 400. By mirroring the requests for data to the request analysis server 400, the request analysis server 400 receives a copy of the traffic seen by the provider of network connectivity 403. Such an arrangement may be referred to as "out-of-band" because the request analysis server 400 is not between the client machine 401 and the provider of network connectivity 403. Additionally, and as shown in the example of FIG. 4A, the request analysis server 400 may be co-located with the provider of network connectivity 403 in an out-of-band arrangement, which may eliminate the transfer of the requests for data from the provider of network connectivity 403 to a remote location. Thus, such an arrangement may further protect PII of subscribers of the provider of network connectivity 403 by, for example, preventing interception of the requests for data by a third party and preventing unintentional transmission of the requests data to an unintended recipient. Moreover, mirroring may help ensure that the requests for data are unchanged and uncorrupted when the requests for data are analyzed by the request analysis server 400. In some implementations, the request analysis server 400 may be in communication with the provider of network connectivity 403 but located at a different location than the provider of network connectivity 403.

In some implementations, the request analysis server 400 may be between the client 401 and the provider of network connectivity 403 such that requests for data from the client 401 pass through the request analysis server 400. Such an arrangement may be referred to as an "in-band" or "in-line" arrangement.

Figure 4B:
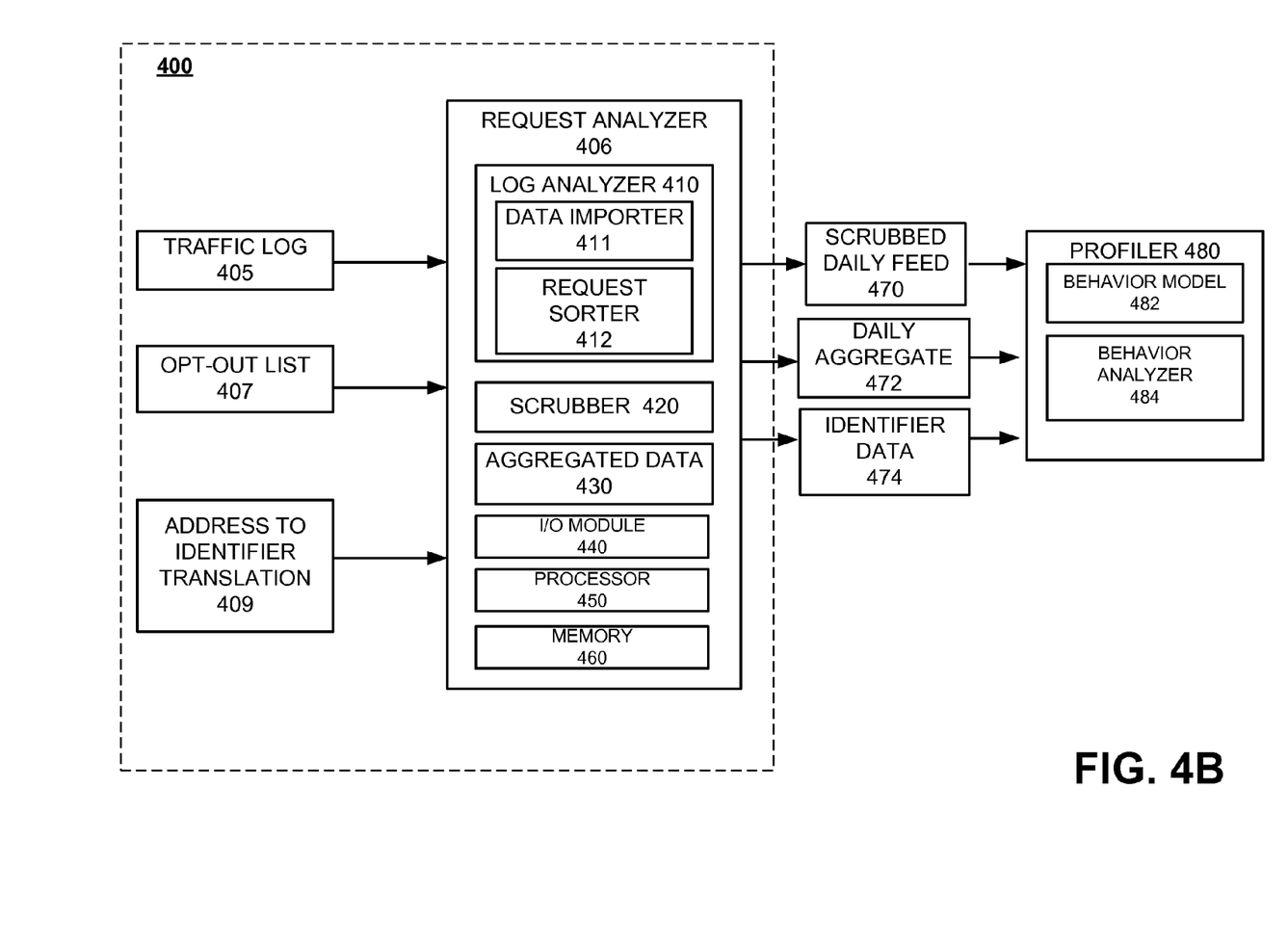

Referring to FIG. 4B, the request analysis server 400 is shown in greater detail. As discussed above, the request analysis server 400 analyzes requests for data received by the provider of network connectivity 403. The request analysis server 400 stores the mirrored requests in a traffic log 405, and stores or otherwise has access to an opt-out list 407 and an address-to-unique subscriber identifier translation 409. The request analysis server 400 also includes a request analyzer 406.

The request analyzer 406 includes a log analyzer 410, a scrubber 420, aggregated data 430, an input/output module 440, processor 450, and a memory 460. In some implementations, the request analyzer 406 may be similar to the anonymization server 124 discussed above with respect to FIG. 1. In the example shown in FIG. 4B, the request analysis server 400 produces a scrubbed daily feed 470, a daily aggregate 472, and identifier data 474, all of which may be referred to as outputs of the request analyzer 406 or of the request analysis server 400. One or more of the scrubbed daily feed 470, the daily aggregate 472, and the identifier data 474 may be accessed by a profiler 480. The profiler 480 uses the outputs of the request analyzer 406 to determine a characteristic of one or more subscribers. The profiler 480 may be similar to the profile server 130 discussed above with respect to FIG. 1.

In greater detail, the request analyzer 406 accesses the traffic log 405. The traffic log 405 includes requests for data (such as web surfing traffic) received from subscribers to the provider of network connectivity 403. The requests for data may include an address for retrieving information over HTTP. For example, the requests for data may include an address (e.g., URL) of a web page. In other examples, the requests for data may include an address that returns textual information or XML code. The requests for data may be, for example, a search query entered into a search engine, and therefore include one or more search terms. The traffic log 405 also includes one or more addresses of a device from which the requests for data originated (e.g., an IP address). The requests for data also may include third-party identifier of a subscriber such as a cookie from a third-party such as an advertising server or other server.

The traffic log 405 also may include a time stamp associated with each of the requests for data, and the time stamp indicates when the request for data was received and/or processed by the provider of network connectivity 403. Table 1 shows an example of data that may be included in the traffic log 405. In the example shown in Table 1, the one or more addresses associated with the requests for data are internet protocol addresses, the requests for data include Uniform Resource Locators (URLs), and the third-party identifier of the subscriber is a cookie. Additionally, in the example shown in Table 1, the traffic log 405 also includes an identifier of the type of information (e.g., text or HTML) included in the request for data ("Mime Type").

Table 2 shows an example of an address-to-identifier translation 409. In the example shown in Table 2, the addresses are IP addresses and the subscriber identifiers are six-digit numbers.

TABLE 2

| IP Address | Subscriber Identifier | Time Stamp |
|---|---|---|
| 192.168.0.100 | 111111 | 8/14/2007 11:01:000am |
| 192.168.0.161 | 124921 | 8/14/2007 11:21:000am |
| 192.168.0.167 | 211331 | 8/14/2007 11:41:000am |
| 192.168.0.100 | 134112 | 8/15/2007 11:41:000pm |

The example of Table 2 shows an example of an IP address (192.168.0.100) being reassigned to a different account over a period of time. In this example, the IP address is assigned to the account corresponding to the identifier

TABLE 1

| IP Address | URL | Cookie | Mime Type | Time Stamp |
|---|---|---|---|---|
| 192.168.0.100 | http://search.yahoo.com/search;_ylt=Al_tE?p=wilco &csz=LeesburgVA&ei=UTF-8 | cookie: ID1=1 | text/html | 11:16:001 am 8/14/2007 |
| 192.168.0.100 | http://www.amazon.com/Ghost-Born-Wilco/dp/B00020P7TM | cookie: A=1 | text/html | 8/14/2007 11:17:051 am |
| 192.168.0.100 | http://www.buy.com/cat/MP3_Players_Mini_WMA_Player/440.html | cookie: XH@d4J | text/html | 8/14/2007 11:18:000 am |
| 192.168.0.100, | http://www.woot.com | cookie: CID1=10 | text/html | 8/14/2007 11:18:959 am |
| 192.168.0.100 | http://electronics.listings.ebay.com/Apple-iPod-MP3-Players_WListingItemList | cookie: U=122323 | text/html | 8/14/2007 11:21:055 am |
| 192.168.0.100 | http://reviews.cnet.com/Music/2001-6450_7-0.html?tag=cnetfd.dir | cookie: XsWsd22d | text/xml | 8/14/2007 11:22:034 am |
| 192.168.0.100 | http://www.youtube.com/watch?v=VA3zXzzMusY | cookie: ID=****** | text/html | 8/14/2007 11:23:603 am |

The request analyzer 406 also may access an opt-out list 407, which includes a list of subscribers, or identifiers of subscribers, whose requests are not analyzed. The opt-out list 407 may be a list of unique subscriber identifiers (discussed below) or other identifiers associated with subscribers who have informed the provider of network connectivity 403 that they do not want any information about their requests for data to be analyzed or shared. In some implementations, an opt-out list 407 may be an opt-in list that includes accounts of subscribers that have indicated that they are willing to have their requests analyzed (with the default being to exclude those who have not opted-in). Requests associated with accounts included in the opt-out list 407 are either not accessed by the request analyzer 406 or the requests are not analyzed by the request analyzer 406.

The request analyzer 406 also accesses an address-to-identifier translation 409. The address-to-identifier translation 409 maps a unique subscriber identifier with an address (e.g., an IP address) of a device of a subscriber. As described above with respect to FIG. 1, the unique subscriber identifier may be a hashed version of the account number assigned to the subscriber by the provider of network connectivity 403. The address-to-identifier translation 409 may allow activity of a particular subscriber to be monitored even when the IP address associated with a particular subscriber changes. For example, the IP address associated with a particular subscriber account may change every twelve hours. However, the provider of network connectivity 403 is aware of the change of IP address and, thus can provide the address-to-identifier translation 409 with the appropriate information to correlated different IP addresses (and hence different requests) assigned to the subscriber with the same unique subscriber identifier.

"111111" on Aug. 14, 2007, but by the following day, the IP address is assigned to the account corresponding to the identifier "134112." Thus, the address-to-identifier translation 409 allows the request analyzer 406 to group requests for data from a particular subscriber even if the IP address (or other type of address) changes over time. Additionally, the address-to-identifier translation 409 allows the IP address of the client machine 401 to be obscured by the unique subscriber identifier. Thus, the address-to-identifier translation 409 may server as an additional measure of protection for the subscriber's PII.

To access and process the traffic log 405, opt-out list 407, and the address-to-identifier translation 409, the request analyzer 406 includes the log analyzer 410. The log analyzer 410 may be similar to the log analyzer 125 discussed above with respect to FIG. 1. The log analyzer 410 may include a data importer 411 that imports the traffic log 405, the opt-out list 407, and the address-to-identifier translation 409 into the log analyzer 410. The log analyzer 410 also may include a request sorter 412 that organizes, sorts, and/or groups the requests for data in the traffic log 405 by one or more addresses associated with a subscriber. For example, the request sorter 412 may organize, sort, or group the requests for data in the traffic log 405 (such as the requests for data shown in Table 1) based on IP addresses such that requests from a particular subscriber are grouped together. The request sorter 412 may do so even if all of the IP addresses for a given subscriber change by using the address-to-identifier translation 409 to map the IP addresses to the corresponding unique subscriber identifier, and then organizing, sorting, or grouping based on the identifier.

The request analyzer 406 also includes the scrubber 420, which removes PII from the requests for data included in the traffic log 405. The scrubber 420 may be similar to the data scrubber 127 discussed above with respect to FIG. 1. For example, in one implementation, the scrubber 420 may remove search terms from a request URL and replace the base URL with a numerical identifier or pattern identifier, as discussed with respect to FIGS. 1 and 2. In other implementations, the scrubber 420 may remove the search terms or other information in a request for data that includes PII, but otherwise keep other search terms or other information in a requested URL. In such an implementation, the scrubber 420 also may replace the base URL with a numerical representation or pattern identifier.

The request analyzer 406 also includes aggregated data 430. The aggregated data 430 may include information from requests for data that have had PII removed by the scrubber 420, and the scrubbed information may be aggregated over a period of time, such as, for example seven days. The aggregated data 430 may include, for a given request for data, a unique subscriber identifier (which may be derived from the address-to-identifier translation 409), a destination pattern identifier (which may represent the destination of the request such as a destination website), a time stamp indicating when the request for data was received by the provider of network connectivity 403, a source pattern identifier (which may represent a website from which the user selected the destination website), and a search term included in the request for data (or a representation of a search term), if any. The pattern identifiers may be obtained from a URL dictionary (such as the one described above) that maps, e.g., a base URL in a requested URL to the pattern identifier. The base URL may be simply the domain or the domain plus some portion or all of a path Thus, the aggregated data 430 is anonymized request data from a subscriber (e.g., data that has the subscriber's PII removed). In some examples, the aggregated data 430 may include an actual search term used by a subscriber in, for example, a search query, but the aggregated data 430 does not include information that allows identification of the subscriber making the query. Additionally, the aggregated data 430 is stored on the request analyzer 406, which may eliminate or reduce the need to transmit the aggregated data 430 to a separate location. Accordingly, retaining the aggregated data on the request analyzer 406 may further protect the subscriber's PII. Table 3 shows an example of the aggregated data 430.

TABLE 3

| Subscriber Identifier | Destination Pattern Identifier | Time Stamp | Source Pattern Identifier | Search Phrase |
| --- | --- | --- | --- | --- |
| 111111 | 3872544 | Aug. 14, 2007 | 3090783 | shoes |
| 111111 | 674605 | Aug. 14 2007 | 3090783 | athletic shoes |
| 111111 | 696786 | Aug. 14, 2007 | 674605 | running shoes |
| 124921 | 696786 | Aug. 14, 2007 | 674605 | joe smith nike air vomero |
| 124921 | 456789 | Aug. 14, 2007 | 674605 | knocked up reston movie listings |
| 124921 | 700541 | Aug. 14, 2007 | 674605 | movie listings |
| 124921 | 496878 | Aug. 14, 2007 | 674605 | reston movie listings |

The request analyzer 406 also includes an input/output module 440, which allows interaction with the request analyzer 406. The input/output module 440 may be, for example, a mouse, keyboard, stylus, printer, or monitor. The input/output module 440 also may include a communications interface, such as a network connection, that allows the request analyzer 406 to communicate and exchange data with other devices and systems, and receive input and output data. The request analyzer 406 also includes the processor 450 and memory 460. The processor 450 may include more than one processor, and the memory 460 may include multiple memory modules. The memory 460 may be large enough to accommodate aggregated data 430 collected over days, weeks, and months. For example, the traffic log 405 may be four Gigabytes of data per day, and the aggregated data 430 may be one hundred Megabytes of data per day. In some implementations, the traffic log 405 and/or the aggregated data 430 may be compressed. Although the request analyzer 406 is shown as a single unit, in other implementations, the components of the request analyzer 406 may be implemented in separate units in communication with each other.

As discussed above, the request analyzer 406 may produce outputs of a scrubbed daily feed 470, a daily aggregate 472, and identifier data 474. The scrubbed daily feed 470 may be derived from the aggregated data 430. In some implementations, the aggregated data 430 may include requests for data that are identified as originating from a household, and the scrubbed daily feed may include only those search terms that are included in requests for data from two or more different households. Including only those search terms that originated from two or more households further protects PII of the subscribers by further obscuring the origin of the search term. Table 4 shows an example of data that may be included in the scrubbed daily feed 470.

TABLE 4

| Subscriber Identifier | Destination Pattern Identifier | Time Stamp | Source Pattern Identifier | Search Phrase |
| --- | --- | --- | --- | --- |
| 111111 | 3872544 | Aug. 14, 2007 | 3090783 | shoes |
| 111111 | 674605 | Aug. 14, 2007 | 3090783 | athletic shoes |
| 111111 | 696786 | Aug. 14, 2007 | 674605 | running shoes |
| 124921 | 700541 | Aug. 14, 2007 | 674605 | movie listings |
| 124921 | 496878 | Aug. 14, 2007 | 674605 | reston movie listings |

Thus, as compared to the data in the aggregated data 430, the scrubbed daily feed 470 includes only those search terms that were included in requests for data from two or more different households. In this example, the requests for data including "joe smith nike air vomero" and "knocked up reston movie listings" are not included because these search terms were not included in requests for data from two or more households. Although in the examples shown in Table 3 and Table 4, the search phrases are shown as actual search terms, the search terms are represented by hashed values or some other obscured representation of the search terms.

The daily aggregate 472 also may be derived from the aggregated data 430 and may include the number of requests made to a particular destination website (represented by the pattern ID), the number of web pages retrieved from the particular destination, and the total amount of time spend viewing the requested web pages from the particular destination. Table 5 shows an example of the daily aggregate 472.

TABLE 5

| Subscriber Identifier | Pattern Identifier | Date | Requests | Pages | Duration |
| --- | --- | --- | --- | --- | --- |
| 111111 | 674605 | Aug. 14, 2007 | 10 | 5 | 2000 |
| 111111 | 671065 | Aug. 14, 2007 | 210 | 45 | 17 |

TABLE 5-continued

| Subscriber Identifier | Pattern Identifier | Date | Requests | Pages | Duration |
|---|---|---|---|---|---|
| 111111 | 671053 | Aug. 14, 2007 | 3 | 2 | 2 |
| 111111 | 3441059 | Aug. 14, 2007 | 72 | 14 | 5 |
| 111111 | 3137862 | Aug. 14, 2007 | 23 | 2 | 3 |
| 111111 | 2940731 | Aug. 14, 2007 | 7 | 1 | 1 |
| 111111 | 3718815 | Aug. 14, 2007 | 54 | 5 | 20 |

In the example shown in Table 5, the daily aggregate 472 indicates that requests for data from a subscriber with an identifier "111111" made ten requests to a destination web site represented by "674605," visited five web pages in the web site as a result of the ten requests, and spent a total of two thousand seconds on the five pages.

The request analyzer 406 also may output identifier data 474. The identifier data 474 may include a third-party identifier (such as a cookie identifier from an advertiser). For example, the third-party identifier may be an identifier included in a cookie provided by an advertiser to the subscriber. Table 6 shows an example of identifier data 474.

TABLE 6

| Account Identifier | Pattern Identifier | Cookie Identifier |
|---|---|---|
| 111111 | siteA | qid=123456 |
| 124921 | siteB | bid=5551234 |

The scrubbed daily feed 470, the daily aggregate 472, and the identifier data 474 may be provided to a profiler 480. The profiler 480 includes a behavior model 482 and a behavior analyzer 484. The profiler 480 may be similar to the profile server 130, the behavior model 482 may be similar to the behavior model store 134, and the behavior analyzer 484 may be similar to the behavior analyzer 136 discussed above with respect to FIG. 1. The profiler 480 may determine a characteristic of the subscriber based on the outputs from the request analyzer 406, such as whether the user is a member of a particular category of users, as discussed above with respect to FIGS. 1 and 2. Continuing the example above, the profiler 480 may determine, based on the daily aggregate 472 and daily feed 470, that a subscriber associated with the account identified by "111111" is intending to purchase a new pair of shoes.

For a given subscriber (identified, e.g., by the unique subscriber identifier), the profiler 480 may output one or more determined characteristics or categories of the subscriber. For example, the profiler 480 may determine that a particular subscriber is intending to purchase a particular good or service such as a new pair of shoes. In this example, the profiler 480 may provide a third-party identifier to an advertising network corresponding to the third-party identifier (e.g., by originally providing the third-party identifier to the subscriber) together with one or more categories or characteristics. The advertising network may target the subscriber with advertisements for shoes.

In other implementations, the profiler may output an identifier of subscribers that fall within a selected category. For example, the profiler 480 may output an identifier, e.g., the unique subscriber identifier, for those subscribers that are categorized as churn intenders. The identifiers may be sent to the profiler 480 sends the account identifier "111111" to the provider of network connectivity 403 such that the provider of network connectivity 403 may target the subscribers with, for example, inducements or incentives, to remain with the provider of network connectivity 403.

In the example discussed with respect to FIG. 4B, the profiler 480 may perform behavior-targeting analysis to inform advertising networks of characteristics of subscribers such that the subscribers may be targeted with relevant advertisements. The profiler 480 also may perform behavior analysis to determine whether the subscriber is likely to switch from the provider of network connectivity 403 to another provider of network connectivity. However, in some implementations, the request analyzer may perform only one of these two functions and any processing or data associated with the eliminated function is also eliminated.

Additionally, in the example discussed with respect to FIG. 4B, the request analyzer 406 and the profiler 480 are shown as separate components in communication with each other. However, this is not necessarily the case. For example, in some implementations, the profiler 480 may be implemented as an integrated component of the request analyzer 406. In these implementations, the scrubbed daily feed 470, the daily aggregate 472, and the identifier data 474 may be stored, temporarily or persistently, on the request analyzer 406 (for example, in the memory 460) and then transferred to the integrated profiler 480. Alternatively, the scrubbed daily feed 470, the daily aggregate 472, and the identifier data 474 may be output from the request analyzer 406 to intermediate data files and then loaded into the integrated profiler 480.

Figure 5:
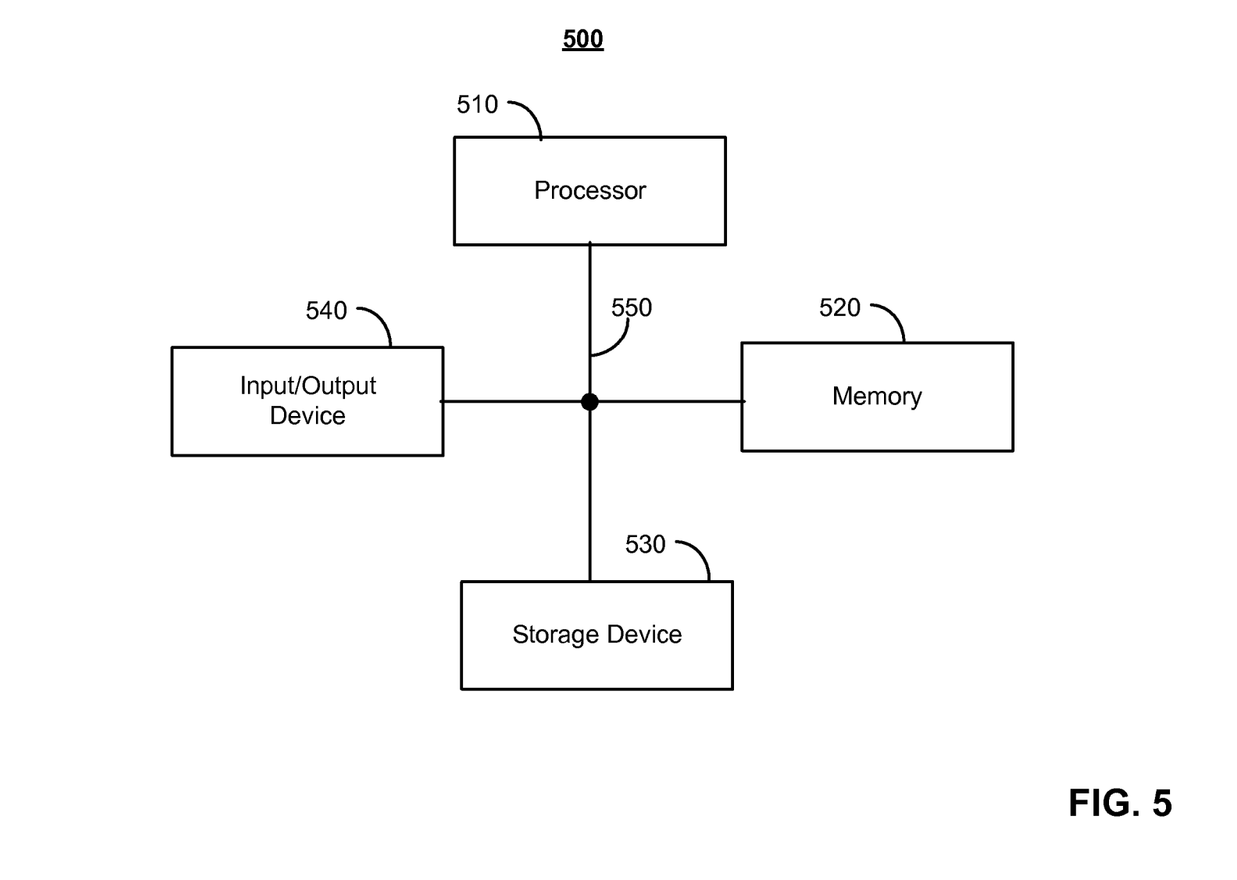
FIG. 5 illustrates a block diagram of a computer system.

FIG. 5 is a block diagram of a computer system 500 that can be used in the operations described above, according to one implementation. The system 500 includes a processor 510, a memory 520, a storage device 530 and an input/output device 540. Each of the components 510, 520, 530, and 540 are interconnected using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In another implementation, the memory 520 is a volatile memory unit. In still another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

For example, the request analyzer 406, the anonymization server 124, and the profile server 130 may include the processor 510 executing computer instructions that are stored in one of memory 520 and storage device 530.

The input/output device 540 provides input/output operations for the system 500. In one implementation, the input/output device 540 includes a keyboard and/or pointing device. In another implementation, the input/output device 540 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, in computer-readable storage medium, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What claimed is:

1. A method comprising:
    accessing requests for data received from multiple client systems, at least some of the requests for data originating from one or more addresses associated with a particular client system of the multiple client system;
    organizing the accessed requests for data into sets of requests based on the one or more addresses such that a set of requests corresponds to the particular client system;
    determining a characteristic of a user of the particular client system based on aspects of the set of requests corresponding to the particular client system and a behavior model;
    extracting a cookie provided by an advertiser from the set of requests corresponding to the particular client system, the cookie including an identifier that identifies the particular client system to the advertiser associated with the cookie; and
    transferring the identifier included in the extracted cookie and the determined characteristic to the advertiser associated with the cookie, wherein no personal identifying information other than the identifier included in the extracted cookie is transferred to the advertiser.

2. The method of claim 1, wherein accessing requests for data received from multiple client systems comprises receiving mirrored requests for data received from multiple client systems and accessing the mirrored requests for data.

3. The method of claim 1, wherein:
    the one or more addresses associated with a particular client system comprise a first address assigned to the particular client system for a first time period and a second address assigned to the particular client system for a second time period,
    the first address is different from the second address, and
    organizing the accessed requests for data into sets of requests comprises organizing the accessed requests for data based on the first and second addresses such that the set of requests that corresponds to the particular client system includes requests made when the first address was assigned to the particular client system and requests made when the second address was assigned to the particular client system.

4. The method of claim 1 further comprising accessing an opt-out list including identifiers of client system, and wherein accessing requests for data received from multiple client systems comprises accessing requests for data received from client systems other than client systems associated with the identifiers.

5. The method of claim 1 further comprising:
    accessing requests for data received from a panel of network users, the panel of network users including individual users having known characteristics; and
    building the behavior model based on the requests for data received from a panel of network users and the known characteristics of the individual users included in the panel of network users.

6. The method of claim 1, further comprising:
    comparing the sets of requests for data to a dictionary including at least portions of requests for data and numerical values representing the portions of requests for data stored in association with the portions of requests for data;
    determining corresponding numerical values for the requests for data included in the sets of requests based on the comparison; and
    replacing requests for data included in the sets of requests for data with the corresponding numerical values.

7. The method of claim 1, further comprising:
    determining an aggregate duration of time a client system spent displaying a website associated with one or more requests in the set of requests corresponding to the client system, the website being associated with the advertiser,
    wherein determining the characteristic of the user of the particular client system is based at least in part on the determined aggregate duration.

8. The method of claim 2, wherein receiving mirrored requests for data received from multiple client systems comprises receiving the mirrored request from a switch located at a provider of network connectivity.

9. A non-transitory computer readable medium storing instructions that, when executed by one or more processors, cause the one or more processors to perform operations comprising:

accessing requests for data received from multiple client systems, at least some of the requests for data originating from one or more addresses associated with a particular client system of the multiple client system;

organizing the accessed requests for data into sets of requests based on the one or more addresses such that a set of requests corresponds to the particular client system;

determining a characteristic of a user of the particular client system based on aspects of the set of requests corresponding to the particular client system and a behavior model;

extracting a cookie provided by an advertiser from the set of requests corresponding to the particular client system, the cookie including an identifier that identifies the particular client system to the advertiser associated with the cookie; and transferring the identifier included in the extracted cookie and the determined characteristic to the advertiser associated with the cookie, wherein no personal identifying information other than the identifier included in the extracted cookie is transferred to the advertiser.

10. The non-transitory computer readable medium of claim 9, wherein the operation of accessing requests for data received from multiple client systems comprises receiving mirrored requests for data received from multiple client systems and accessing the mirrored requests for data.

11. The non-transitory computer readable medium of claim 9, wherein:

the one or more addresses associated with a particular client system comprise a first address assigned to the particular client system for a first time period and a second address assigned to the particular client system for a second time period, the first address is different from the second address, and the operation of organizing the accessed requests for data into sets of requests comprises organizing the accessed requests for data based on the first and second addresses such that the set of requests that corresponds to the particular client system includes requests made when the first address was assigned to the particular client system and requests made when the second address was assigned to the particular client system.

12. The non-transitory computer readable medium of claim 9, wherein the operations further comprise the operation of accessing an opt-out list including identifiers of client system, and wherein accessing requests for data received from multiple client systems comprises accessing requests for data received from client systems other than client systems associated with the identifiers.

13. The non-transitory computer readable medium of claim 9, wherein the operations further comprise the operations of:

accessing requests for data received from a panel of network users, the panel of network users including individual users having known characteristics; and building the behavior model based on the requests for data received from a panel of network users and the known characteristics of the individual users included in the panel of network users.

14. The non-transitory computer readable medium of claim 9, wherein the operations further comprise the operations of:

comparing the sets of requests for data to a dictionary including at least portions of requests for data and numerical values representing the portions of requests for data stored in association with the portions of requests for data;

determining corresponding numerical values for the requests for data included in the sets of requests based on the comparison; and replacing requests for data included in the sets of requests for data with the corresponding numerical values.

15. The non-transitory computer readable medium of claim 9, wherein the operations further comprise the operation of:

determining an aggregate duration of time a client system spent displaying a website associated with one or more requests in the set of requests corresponding to the client system, the website being associated with the advertiser, wherein determining the characteristic of the user of the particular client system is based at least in part on the determined aggregate duration.

16. The non-transitory computer readable medium of claim 10, wherein receiving mirrored requests for data received from multiple client systems comprises receiving the mirrored request from a switch located at a provider of network connectivity.

* * * * *